Figure 1:
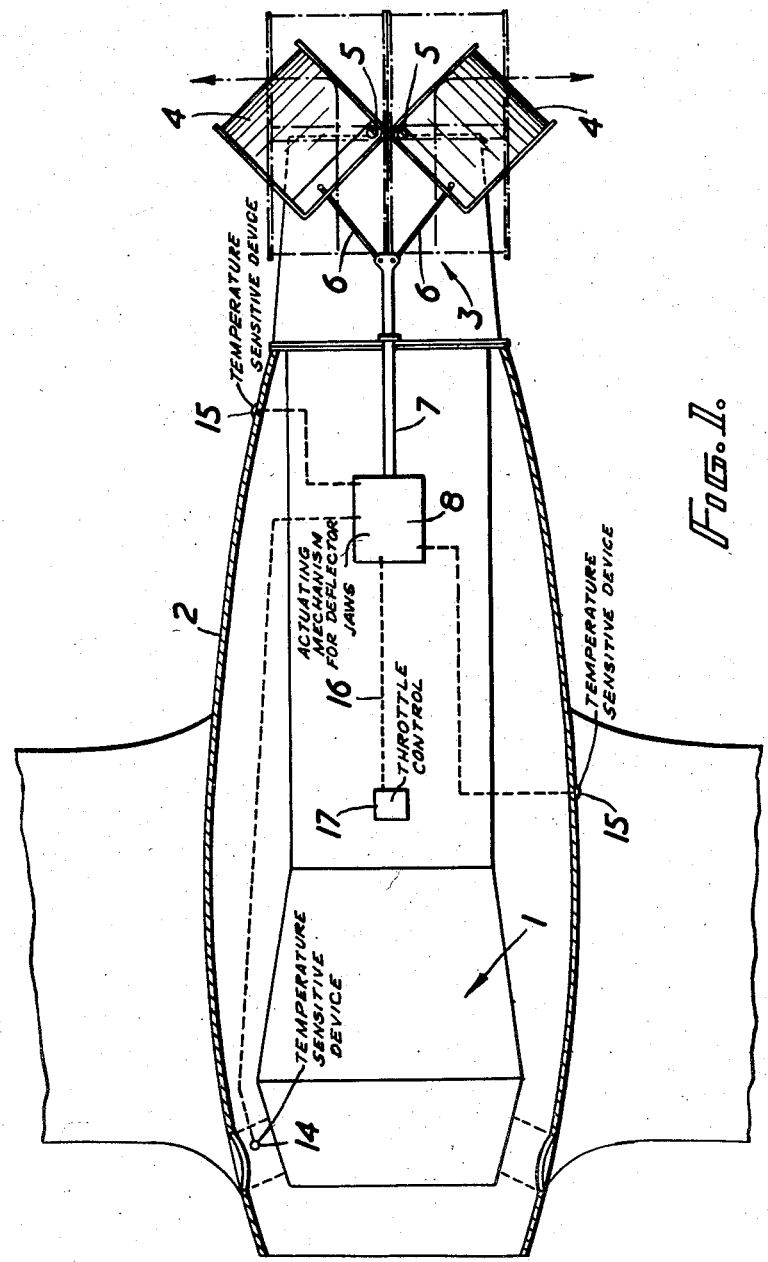

Feb. 3, 1959 W. E. P. JOHNSON 2,871,656
JET-DIVERTING EQUIPMENT
Filed Jan. 25, 1954 2 Sheets-Sheet 2

INVENTOR
William E. P. Johnson
BY Stevens, Davis, Miller & Mosher
his ATTORNEYS

United States Patent Office 2,871,656
Patented Feb. 3, 1959

2,871,656
JET-DIVERTING EQUIPMENT

William E. P. Johnson, Hempstead, London, England, assignor to Power Jets (Research & Development) Limited, London, England, a British company Application January 25, 1954, Serial No. 405,963

Claims priority, application Great Britain December 7, 1951

1 Claim. (Cl. 60—35.54)

This invention relates to jet-propelled vehicles and is a continuation-in-part of application Serial No. 323,367 (abandoned) filed December 1, 1952. The invention is particularly concerned with the temporary diversion of the jet from its normal rearward direction so as to reduce the propulsive thrust or in the extreme case to reverse the thrust. For jet-propelled aircraft this is known as "thrust-spoiling" or "thrust-reversal." In "thrust-spoiling" the jet is temporarily diverted from rearward flow along the line of flight and its propulsive effect reduced, for example, by it being caused to divide and flow laterally outward on each side of the aircraft. In "thrust-reversal" the laterally directed streams of gas are given a forward component of direction so that a reversed or "braking" thrust is applied which operates to reduce the forward speed of the aircraft. This temporary diversion of the jet flow may be accomplished by the appropriate setting or adjustment of baffles or other wall structure associated with the jet-pipe and which may normally form part of said pipe.

If jet diversion is performed when reducing the forward speed of a vehicle, e. g. when landing an aircraft a condition may be reached at which the speed of the vehicle is insufficient to prevent the diverted jet either from being sucked in through the air intake to the gas turbine or other engine, or else flowing undesirably near the crew or passenger compartment. In the case of a gas turbine, the hot gases of the diverted jet could cause considerable damage to the vehicle and endanger the lives of the occupants. It is an object of the present invention to provide jet-diverting equipment which will reduce the possibility of such an occurrence.

Accordingly the present invention provides jet-diverting equipment for a jet propelled vehicle comprising diverting means for temporarily diverting the jet from its normal rearward direction so as at least to reduce the propulsive thrust thereof, actuating means for the said diverting means, means for opposing the said diversion and thermostatically operable means for controlling the said opposing means in response to an increase above a predetermined value of the temperature at a certain part of the vehicle.

The said thermostatically operable means may include a thermocouple so positioned as to be responsive to temperature at a certain part of the outside casing or "skin" of the vehicle and/or in the air-intake duct of the engine.

The effect of the jet-diversion may be reduced by providing means for operating a throttle control of a gas turbine jet engine producing the propulsive jet, the said thermostatically operable means controlling both the said opposing means and the throttle-operating means.

Figure 2:
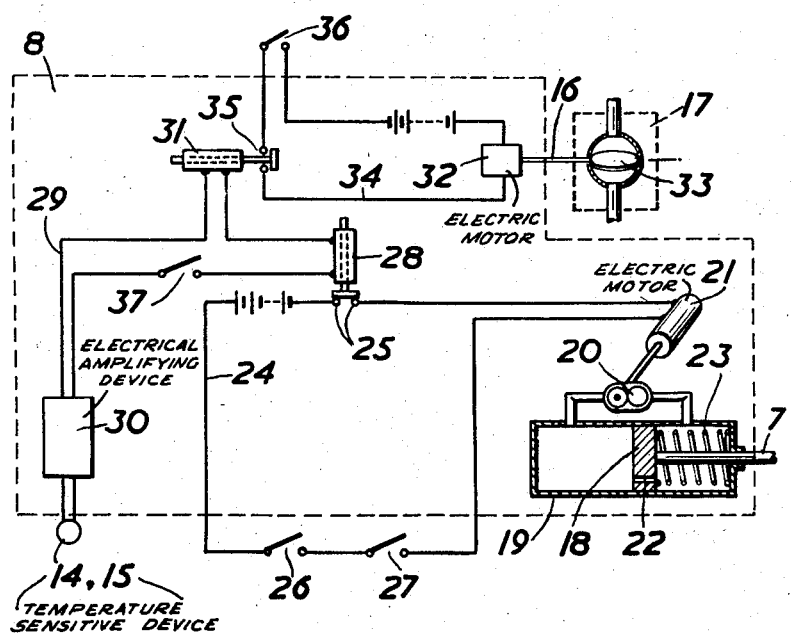

The invention is especially, but not exclusively, applicable to jet-propelled aircraft embodying gas turbine plant and, by way of example, the invention will now be described with reference to the accompanying drawings, in which:

Figure 1 is a diagrammatic plan view of a nacelle 2 of a jet-propelled aircraft housing a gas turbine jet engine 1 having "thrust-spoiling" or "thrust-reversal" apparatus indicated generally by arrow 3 and Figure 2 is a diagram showing control apparatus for the "thrust-spoiling" or "thrust-reversal" apparatus 3.

The apparatus indicated by 3 in Figure 1 may be of any known type, for example, the pivotally mounted jaw type as illustrated. This apparatus comprises two so-called jaws 4 of sheet metal pivotally mounted to a support 5 at the downstream end of the jet-pipe. The jaws are opened or closed by a rod 7 connected by links 6 to the jaws. The rod 7 is operated by a mechanism shown by box 8. This mechanism may be of any suitable kind, for example, of a combined electrical and hydraulic nature such as that described with reference to Figure 2. The "thrust-spoiling" apparatus illustrated in Figure 1 at 3 has been described in application Serial No. 266,923 filed January 15, 1952, now Patent No. 2,715,312, issued August 16, 1955, application Serial No. 684,454 filed July 18, 1946, now abandoned, and application Serial No. 358,743 filed June 1, 1953.

The mechanism 8 includes apparatus which is actuated, as required, to spoil or reduce the thrust or in a limiting case to provide a braking thrust. A control for this purpose may be, for example, on the pilot's control panel. In accordance with the present invention it is required to provide further apparatus included in the mechanism 8 for opposing the jet-diversion and which comes into operation automatically when the temperature at certain positions in the aircraft rises to a pre-selected value due to excessive heating by the diverted jet. In order to detect the excessive rise in temperature, thermostatic devices such as thermocouples may be placed at certain positions on the outside casing or "skin" of the aircraft, for example, outside the crew or passenger compartments. Such devices are shown by 15. If the speed of the aircraft is not sufficiently high the diverted jet might be taken in at the air-intake of the engine or unduly heat the air being taken in, thereby affecting the performance of the engine and in order to detect this excessive rise of temperature in the air-intake a thermostatic device 14 connected to the mechanism 8 is provided. One or more of the devices 14 or 15 may be employed and when the temperature at the positions of these devices rises above a predetermined value the actuating mechanism 8 is opposed to reduce the amount of jet-diversion. In addition to causing a reduction in the amount of jet-diversion the devices 14, 15 may also cause the engine throttle or another engine control valve to be operated in order to reduce the thrust of the jet. For this purpose a connection 16 between the mechanism 8 and a throttle 17 is provided.

Figure 2 portrays diagrammatically one possible arrangement for the mechanism 8 and the throttle control 17. Both the mechanism 8 and the control 17 are shown by broken lines. The mechanism 8 comprises a piston 18 carried on the end of rod 7 and positioned for reciprocation within a cylinder 19. The piston is moved to the right as viewed in Figure 2 to actuate the jet-diverting jaws 4 by a hydraulic pump 20, the pump 20 being driven by an electric motor 21. The pumped fluid is allowed to circulate at a predetermined rate through an orifice 22 in the piston 18. The piston is urged in the opposite direction, i. e. to the left as viewed in Figure 2, by a spring 23. The motor 21 is energised by an electrical circuit 24 including a pair of solenoid-operated contacts 25 of an electrical relay, a master-switch 26 and a pilot-operated switch 27. The contacts 25 are closed when solenoid 28 of the electrical relay is de-energised but when the solenoid is energised the contacts are open thereby breaking the circuit to the electric motor. The solenoid 28 is energised by an electrical circuit 29 comprising the thermostatic devices 14, 15 which are, for example, thermocouples and an electrical amplifying device 30. The manually-operated master-switch 37 is also included in the circuit 29. The circuit 29 also includes the solenoid of a second relay 31. The relay 31 controls an energising circuit for another electric motor 32 which drives through shaft 16 a butterfly valve 33 of the engine throttle control 17. The motor 32 is energised by an electrical circuit 34 including a battery, a pair of contacts 35 normally open but closed when the solenoid 31 is energised and a manually operable switch 36.

The operation of the control circuit is as follows. Firstly the master-switches 26 and 37 are closed. Then on closing the switch 27, the motor 21 is energised driving the pump 20 which moves the piston 18 to the right as viewed in Figure 2 so turning the jaws 4 to divert the jet. Should the diverted jet heat the devices 14 and 15 above the predetermined temperature the solenoid 28 is energised and the contacts 25 are broken thereby stopping the motor 21. The piston 18 now moves to the left as seen in Figure 2 under the action of the spring 23 thus moving the jaws to reduce the amount of jet-diversion. When the temperature at the points 14 and 15 has fallen below the predetermined value the solenoid is de-energised and the contacts 25 are again closed, thereby energising the motor 21 and moving the piston 18 and the rod 7 to the right to bring the jet-diversion equipment into full operation once more. If it is also required to control the throttle 17 the switch 36 is closed and when the temperature-detecting devices 14, 15 are heated above the predetermined limiting value the solenoid 31 in series with solenoid 28 is energised thus closing contacts 35 and completing the circuit in the motor 32. This rotates the butterfly valve 33 thus closing the throttle. The motor 32 is provided with a limit switch not shown, by which the butterfly valve 33 is allowed to return to its open position. The master-switch 37 when open prevents the devices 14, 15 from energising the solenoids 28 and 31, and is intended to be used to render the devices inoperative for the purpose of testing the jet-diverting equipment when the aircraft is on the ground.

The mechanism and associated control devices enable the jet-diverting apparatus to be used with safety. In the event of changes in the operating conditions of the aircraft, e. g. reduction in speed causing the diverted jet to heat unduly the aircraft controls or "skin" or to enter the air-intake or to heat the inlet air to the engine, the devices 14, 15 fitted, would respond to the changes and cause the mechanism 8 to oppose the jet-diversion, either by operating the jet-diverting apparatus or by closing the engine throttle, or by a combination of both.

The invention has only been described with reference to an aircraft, but is, of course, applicable to any other vehicle which is jet-propelled. Also, the jet may be produced by a gas-turbine plant or by any other means.

What I claim is:

An aircraft including a jet-propulsion gas turbine power plant, a jet-nozzle connected to the power plant, an air intake duct leading to the power plant, pivotably mounted jet-diversion members positioned at the discharge end of the jet-nozzle, a linkage to vary the position of the jet diversion members, a first thermocouple mounted with its hot junction in the air intake duct, a second thermocouple mounted with its hot junction outside the power plant and at a position where heating of the aircraft structure by the diverted jet above a predetermined temperature can occur, a cylinder, a spring-loaded piston slidable in the cylinder and connected to the linkage, a pump connected to supply fluid to said cylinder to move the piston in opposition to its spring load, a constantly open restricted outlet from said cylinder for said fluid, a throttle for the power plant, an electrical amplifying device to amplify signals derived from the thermocouples, a first electric motor to drive the pump, a first electrical circuit connected to the first motor, a second electric motor to operate the throttle, a second electrical circuit connected to the second electric motor, a third electrical circuit connected to the amplifying device, a first relay in the third circuit operative to break the first circuit, and a second relay in the third circuit operative to make the second circuit, the third circuit being energized by the amplifying device whenever either of the thermocouples detects a temperature above the predetermined temperature.

References Cited in the file of this patent

UNITED STATES PATENTS

| | | |
|---|---|---|
| 2,291,783 | Baak | Aug. 4, 1942 |
| 2,527,732 | Imbert | Oct. 31, 1950 |
| 2,564,127 | Orr | Aug. 14, 1951 |
| 2,619,794 | Lombard | Dec. 2, 1952 |
| 2,674,843 | Lombard | Apr. 13, 1954 |
| 2,699,524 | Jackson et al. | Jan. 11, 1955 |
| 2,715,312 | Brame | Aug. 16, 1955 |
| 2,742,756 | De Boisblanc | Apr. 24, 1956 |

FOREIGN PATENTS

| | | |
|---|---|---|
| 613,989 | Great Britain | Dec. 8, 1948 |